United States Patent [19]

Spydevold

[11] Patent Number: 5,277,852
[45] Date of Patent: Jan. 11, 1994

[54] PROCESS AND APPARATUS FOR THE PRODUCTION OF CELLULAR PLASTIC

[75] Inventor: Baard Spydevold, Bloomenholm, Norway

[73] Assignee: Scandinor A/S, Blommenholm, Norway

[21] Appl. No.: 820,860
[22] PCT Filed: Jul. 16, 1990
[86] PCT No.: PCT/NO90/00118
§ 371 Date: Jan. 17, 1992
§ 102(e) Date: Jan. 17, 1992
[87] PCT Pub. No.: WO91/01212
PCT Pub. Date: Feb. 7, 1991

[30] Foreign Application Priority Data

Jul. 17, 1989 [NO] Norway ................................. 892921
Nov. 17, 1989 [NO] Norway ................................. 894583

[51] Int. Cl.$^5$ ............................................. B29C 67/22
[52] U.S. Cl. ............................ 264/51; 264/54; 264/338; 425/4 C; 425/325
[58] Field of Search .............. 264/45.5, 51, 53, 54, 264/DIG.; 425/4 C, 325, 327, 328; 264/300, 338

[56] References Cited

U.S. PATENT DOCUMENTS

| | | | |
|---|---|---|---|
| 3,310,617 | 3/1967 | Dygert et al. | 264/53 |
| 3,551,545 | 12/1970 | Overdiep | 264/323 |
| 3,596,313 | 8/1971 | Darmochwal | 425/89 |
| 4,017,245 | 4/1977 | Lang | 425/327 |
| 4,049,760 | 9/1977 | Lozach | 264/51 |
| 4,187,066 | 2/1980 | Hobson et al. | 425/327 |
| 4,284,596 | 8/1981 | Inokuchi et al. | 264/50 |
| 4,344,710 | 8/1982 | Johnson et al. | 264/53 |
| 4,361,530 | 11/1982 | Peer | 264/40.7 |
| 4,456,571 | 6/1984 | Johnson | 425/4 C |
| 4,657,715 | 4/1987 | Myers et al. | 264/45.5 |
| 4,773,448 | 9/1988 | Francis | 264/45.5 |
| 4,789,513 | 12/1988 | Cloeren | 425/133.5 |
| 4,960,549 | 10/1990 | Brooks et al. | 264/45.5 |
| 5,116,881 | 5/1992 | Park et al. | 264/54 |

FOREIGN PATENT DOCUMENTS

| | | |
|---|---|---|
| 1629280 | 4/1966 | Fed. Rep. of Germany. |
| 2306573 | 2/1973 | Fed. Rep. of Germany. |
| 52-007022 | 2/1977 | Japan ................................ 425/325 |

Primary Examiner—Allan R. Kuhns
Attorney, Agent, or Firm—Browdy and Neimark

[57] ABSTRACT

A process for the continuous or semi-continuous production of cellular plastic from a plastic mass containing a blowing agent and, optionally, other process-regulative substances and additives. The process starts by raw materials to a plastic processing machine and kneading the raw materials in the plastic processing machine under conditions of temperature and pressure which will produce an expanding mass only upon release of pressure. The expanding mass is transferred directly to a cooling zone to produce a continuous mass having high viscosity and rigidity and an approximately flat velocity profile under pressure formed by an upstream-directed pressure component. At varying intervals the plastic mass is transferred to a braking-retaining zone which may be an integral part of the cooling zone for build-up of the upstream-directed pressure component until the pressure in the plastic mass in the zones located upstream is sufficient to prevent expansion of the plastic mass. The final step in the process is controlled to expand the mass to the desired density after transfer to a heating/expansion/forming zone.

13 Claims, 1 Drawing Sheet

PROCESS AND APPARATUS FOR THE PRODUCTION OF CELLULAR PLASTIC

THE PRIOR ART

The present invention relates to a process for the continuous or semi-continuous production of cellular plastic from a plastic mass containing a blowing agent and, optionally, other process-regulative substances and additives.

Production of cellular plastic (foamed plastic) from thermoplastic materials has increased sharply. The key reasons for this are low consumption of raw materials relative to volume and high thermal insulation value.

There are several known processes for production of plastic foam from thermoplastic resins, including, for example "bead foam" of polystyrene (Styropor) and the static high-pressure process for the production of PVC foam having low density and closed cells. The "bead foam" process, which is a multi-stage process, produces a polystyrene foam having low density but with relatively low physical values. The static high-pressure process produces PVC foam having low density, closed cells and high quality, but is a highly manual process associated with high production costs, and it suffers considerable limitations with respect to the product's shape.

Of fully continuous processes, extrusion is the one used most frequently. It is usually relatively easy to control and is normally associated with low production costs.

Today, the use of plastic processing machines for continuous production of foamed plastic, for example extruders, generally involves the employment of physical blowing agents for foaming of the cellular plastic with low density. For higher densities, chemical blowing agents are usually the basis for the foaming process.

The thermoplastics resins best suited for foaming are: Polystyrenes (PS), including polymerisates (HIPS, SB, SAN, ABS), polyethylene (LDPE) and the copolymerisate (EVA), polyvinylchlorides (PVC) including polyblends, and polypropylenes (PP).

Favorable conditions for foaming are obtained when the melt viscosity of the raw material falls slowly and evenly in the temperature ranges for softening. Therefore, the amorphous thermoplastic resins are easier to foam than the crystalline ones. The partly crystalline thermoplastic materials are usually cross-linked chemically or cross-linked by radiation prior to or in connection with the foaming. In this way there is obtained a more favorable viscosity curve as function of the temperature.

In the extrusion of plastic foam, the foaming process itself is dependent on the plastic's viscosity and the melt's tensile capacity, the gas pressure of the blowing agent and the exterior pressure and interaction between the melt and the blowing agent.

Because plastic foam has greater friction against the wall of a tool connected with a plastic processing machine such as an extruder, than does an unexpanded plastic material, it is generally desirable that the foaming should take place only after the plastic compound has left the tool. One condition for this is that the exterior pressure on the melt containing active blowing agent be high enough to prevent expansion. In presently known production processes, after the plastic melt leaves the processing machine's tool, the external pressure on the melt decreases and the plastic material expands as a result of oversaturation of the gas in the plastic material.

One process parameter that has a heavy influence on the cellular structure and thus the quality of the extrudate is the temperature of the material. In the case of too low a material temperature, the plastic mixture would not be capable of expanding completely due to a relatively high melt viscosity, resulting in a relatively high density. If the temperature of the material is too high, the melt viscosity will be low, which easily causes the cells to be ruptured with a high density as a result.

In order to produce plastic foam having low, uniform density and closed cells, it is necessary to produce an extrudate where the gas cells are not ruptured to pieces due to unequal velocity in the direction of low at the outlet of the forming tool where the pressure is reduced and the gas cells are formed. At the same time, it is necessary to have an external pressure on the plastic melt both in the plastic processing machine and in the tool that prevents expansion of the plastic material.

These two criteria today constitute a limiting factor for the potential of producing thick profiles of plastic foam with closed cells by an automatic process where the plastic foam has low density that is uniform throughout the entire cross-section. This is particularly true when chemical blowing agents are used, because the gas pressure in chemical blowing agents (such as, for example, azodicarbonamide or sodium bicarbonate) is much higher than the gas pressure in the physical blowing agents that are normally used (for example, KFK gases, $CO_2$ or $N_2$).

The problems related to shearing of the plastic melt and tearing up of the gas cells by pressure reduction are alleviated today either by restricting the addition of blowing agent or by the fact that the plastic melt has very limited layer thickness on pressure build-up and on expansion. This is particularly true for chemical blowing agents, but there are also considerable limitations with use of physical blowing agents.

It is often desirable to be able to use chemical blowing agents for thicker plastic foam products, too, because the actual production process is usually simpler than with use of physical blowing agents, and the end product's properties can usually be controlled better than with the use of physical blowing agents. This is a result of, inter alia, the higher gas pressure in the chemical blowing agent compared with the gas pressure in physical blowing agents.

Various tool principles have been developed in connection with continuous production of foam, particularly in connection with extrusion. An extrusion tool has, in particular, two important functions:
1) Building up a sufficient pressure in the tool and extruder
2) Forming the extrudate to the desired shape.

Continuous foaming of thermoplastic materials takes place in two principally different ways:
1) Free foaming
2) Controlled foaming inwards.

Free foaming is usually used for relatively simple profiles. The foamed extrudate is normally collected by a calibration unit a short distance away from the outlet of the tool. The required melt pressure in the tool is normally built up by the lips of the tool.

In forming inwards, the required melt pressure is built up by means of a torpedo within the tool, and the calibration unit is securely connected to the tool itself. The calibration unit has the same internal shape as the tool nozzle. The melt is externally cooled down and is held securely to the walls of the calibration unit by means of a vacuum. At the same time an insert in the tool enables the extrudate to expand inwards in the calibration unit. This method is used for production of pipes, sheets and profiles. The end product has a compact, smooth skin with a lower density toward the core. This method is known as the "Celuka Process".

There are known combinations of the method for free foaming and the "Celuka Process". There are also produced hollow profiles on the basis of a principle similar to the "Celuka Process".

There are also used a variety of principles of co-extrusion of unexpanded skin material and foamed core materials.

Another process that produces build-up in the tool and relatively little shearing of the material on foaming is to so-called "Woodlite Process". This is a method for extrusion of foamed strings that are welded into one unit after leaving the outlet of the tool. The final extrudate, however, has an uneven structure and low flexural strength due to, in part, poor welding together of the different sub-extrudates.

A principle used particularly for production of foamed tubing is the "Armocell Process". By means of a special construction of the flow channel in the tool, sufficient pressure is built up to prevent a premature expansion of the melt. The foamed tube is held at a short distance from the tool by a calibration unit.

All the above tool principles result in considerable limitations in the product's density, percentage of closed cells and dimensions. This is inter alia, because the build-up of the necessary melt pressure to avoid premature expansion, is based on friction between the hot plastic melt and the tool.

DESCRIPTION OF THE INVENTION

The purpose of the present invention is to improve the prior art and to expand its area of usage, while simultaneously avoiding the deficiencies of the prior art and the limitations attendant thereto.

In accordance with this, the present invention relates to a process of the type discussed in the introduction, comprising:
  a) feeding of the raw materials to a plastic processing machine;

the process being characterized in that it further comprises:
  b) kneading of the raw materials in the plastic processing machine under conditions of temperature and pressure which will produce an expanding compound upon release of pressure alone;
  c) transfer of the plastic compound directly to a cooling zone:
  d) cooling of the compound in the cooling zone to a continuous stock having high viscosity and rigidity and an approximately flat velocity profile under pressure formed by an upstream-directed pressure component;
  e) optionally, stepless transfer to a braking-retaining zone;
  f) for build-up of the upstream-directed pressure component until the pressure in the plastic compound in the upstream located zones is sufficient to prevent expansion of the plastic compound;
  g) controlled to expand the compound to the desired density after transfer to a heating/expansion/forming zone.

BRIEF DESCRIPTION OF THE DRAWINGS

The invention will be explained in greater detail below, with reference to the accompanying figures, where.

DETAILED DESCRIPTION OF THE INVENTION

Figure 1:
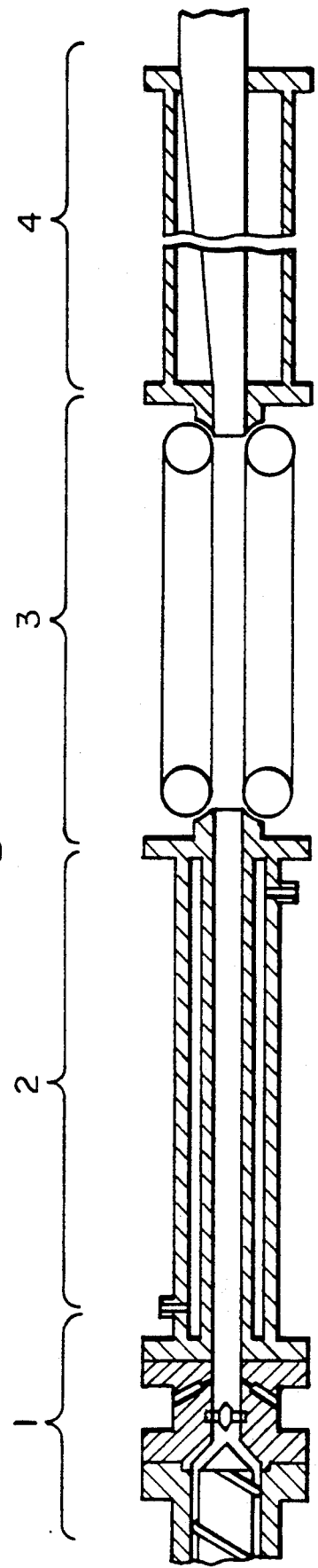
FIGS. 1 and 2 show two possible apparatus systems for carrying out the sequence of a) to g) above.
Figure 2:
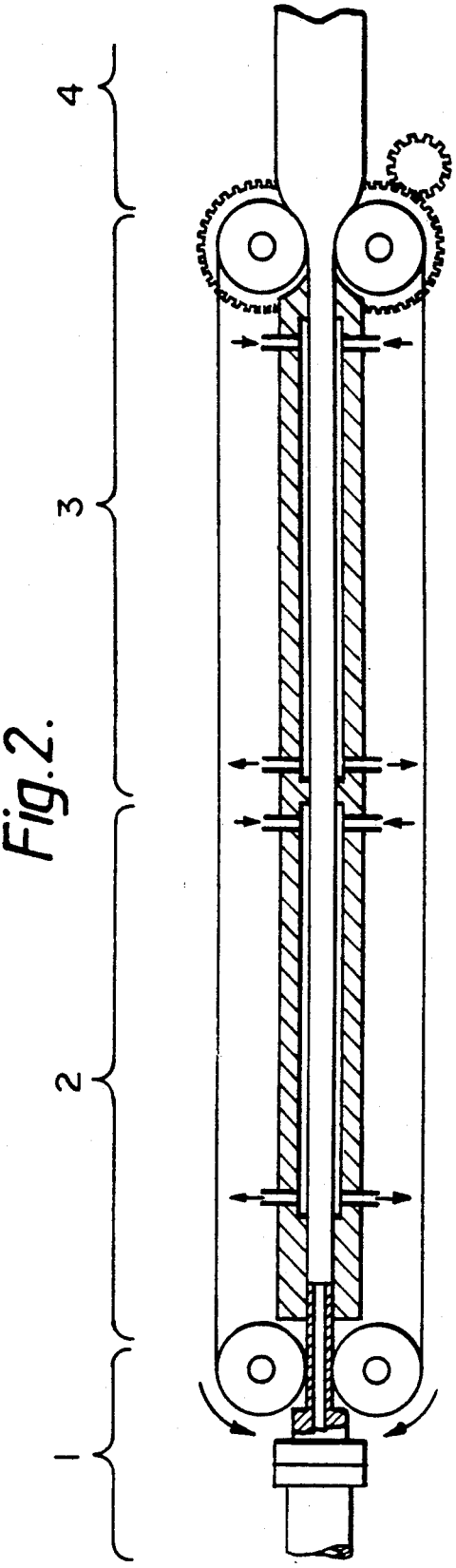

Thermoplastic, blowing agent and other optional process-regulative substances and additives are fed into a plastic processing machine of a known per se type, for example, an extruder 1, where they are to be kneaded together under such conditions of temperature and pressure that an expanding compound will be produced only on pressure release.

Extruders of various types, as well as the mixing conditions used in such extruders, are known and will not be described in further detail here. The important factor is to avoid giving the blowing agent opportunity to expand in the plastic processing machine itself.

The plastic material is kneaded in such a way that all parts of the stock obtain approximately the same temperature, and the fact that this is achieved relatively rapidly results in relatively good control of any possible exothermic or endothermic heat exchange from a chemical blowing agent.

Due to the rapid heating of the entire plastic stock through the mechanical processing, one also achieves a rapid decomposition of the chemical blowing agent, if used.

In order to avoid the problems existing today in connection with the known processes and the known principles for extrusion tools, for obtaining sufficiently high pressure in the tool and extruder where the gas cells are in large degree ruptured at the outlet from the extruder tool (because the pressure build-up is based on shearing effect/friction), there is used, according to the invention's method, a build-up of sufficient pressure in the tool and the extruder to avoid the premature expansion of the plastic material is achieved by braking/holding the plastic material after being cooled down so that the plastic material forms a continuous "piston" for build-up of the necessary pressure to prevent shearing and the resultant rupture of the gas cells.

The invention is illustrated below under reference to the accompanying drawings.

The build-up of the necessary pressure in the tool and extruder is accomplished by cooling down 2 the plastic stock under pressure at the outlet of the extrusion tool 1 in a continuous process sufficient to render the rigidity of the plastic stock high enough that the plastic stock can be slowed down by a braking means 3 which may, for example, be a continuously movable belt. The braking of the plastic material is controlled in such a way that the pressure being built up in the plastic compound is high enough to prevent the compound from expanding. From the extrusion tool or the forming apparatus after the extruder, the plastic material must be maintained under high external pressure without friction between the limiting wall and the plastic stock or with the friction between the wall and the stock being small enough so that the gas cells formed after the pressure is reduced are not ruptured. Due to the absence of friction between the wall and the plastic stock or to the fact that friction is very minimal, the plastic stock in this cooling device 2 will move at a rate that is uniform throughout the entire plastic stock. This means that there occurs no shearing between the various layers in the plastic stock in the direction of movement, or only an insignificant shearing.

The cooling device 2, which must be directly connected to the tool/forming device, may be directly connected to the braking device 3, or the cooling device 2 and the braking device 3 may be one unit. This can be accomplished, for example, if the cooling down of the plastic material is done between continuous endless steel belts, where the steel belts have low temperature. By controlling the speed of the steel belts, the pressure of the compound can be regulated.

After the stock has been slowed down sufficiently, and enough pressure has been obtained by means of the braking device 3, the plastic material is heated up 4 while the pressure is simultaneously reduced, enabling the plastic mass to expand. The heating can be done continuously and directly in connection with the cooling 2 and braking device 3, for example, by means of heated endless steel belts, or the heating can take place, for example, by warming the cooled plastic stock in connection with transport through a heating tunnel with hot air. The cooled plastic stock may also be heated in, for example, a liquid bath.

By heating the plastic material either by the application of exterior heat or by equalizing the interior and exterior temperature of the plastic material, or by a combination of supplying exterior heat and equalizing the temperature of the plastic material, the plastic material will expand until equilibrium is reached between the internal expansion forces in the plastic material and the tensions in the plastic material.

The device 2 for cooling down the plastic compound after the outlet of the tool/forming device with little or no friction between the limiting walls and the plastic compound, the braking/retaining device and the heating device, can be constructed in several basic ways.

Examples of these are the following:

The cooling device 2 which is directly connected to the tool/forming unit after the extruder may be a static cooler having the same or approximately the same internal cross-section as the cross-section at the outlet of the tool/forming device. The walls in the interior cross-section must create minimal friction between wall and plastic compound. This can be accomplished, for example, by high-gloss polishing or chrome plating of the interior walls. At the same time, a lubricating medium may also be applied continuously between the interior walls of the cooling device and the plastic stock to further reduce the friction. The cooling can be done, for example, by chilling the cooling device with tempered oil in channels of the walls therein. The cooling device may also be a set of endless steel belts that are chilled and pressed against the plastic material.

The braking device 3 after the cooling device 2 may consist, for example, of two or more rollers that are pressed against the rigid, cooled-down plastic material, or the braking device may consist of a set of endless steel belts that may be pressed against the plastic material, with their speed being regulated such that the upstream-pressure of the plastic material can be regulated.

The heating unit 4 after the braking/retaining device may be, for example, a chamber filled with warm liquid, where the pressure may be regulated. The heating device may also be a set of endless belts that are heated up.

The heating of the plastic material may also take place, for example, in a static heating unit having an interior cross-section equal to or approximately equal to the cross-section of the plastic stock after the outlet of the braking device. The static heating device must have very low or no friction between the interior walls of the heating device and the plastic stock. The heating may also take place in a heating chamber where the plastic extrudate moves freely.

Often it may be advantageous to heat up the plastic compound under sufficiently high pressure so that the plastic compound will not expand in the heating unit itself. It is thus possible to heat up the plastic material much more rapidly, because the thermal insulation value of the plastic material increases dramatically when expanded.

The friction between the interior walls of the heating unit and the plastic stock should be minimal, because it could otherwise cause difficulties for an optimal control of the pressure in the plastic mixture upstream in the extrusion tool and the extruder. In addition, it is much easier to control the expansion if there is minimal or no friction between the heating unit and the plastic material.

When the plastic extrudate is heated under pressure, the external pressure is reduced after all parts of the extrudate have been brought to the desired temperature, and the plastic material can be expanded until equilibrium has been reached between the interior expansion forces and the tensions in the plastic material.

When the plastic extrudate is heated without external pressure (for example, in a heating chamber), the plastic material will expand simultaneously with the heating.

In this specification is described particularly a process using a plastic extruder or extruders, but any continuous or semi-continuous plastic processing machine meeting the requirements for degree of processing and temperature/pressure conditions could be used.

DESCRIPTION AND EXAMPLES OF PLASTIC COMPOSITIONS AND PROCESSING CONDITIONS

As mentioned earlier, in developing a formula or recipe for a plastic composition, one must take into consideration the plastic processing machine to be used and evaluate the desired properties for the end product. The present process has been developed with the use of PVC. The following have been employed as plastic processing machines:

The various components in the plastic composition have been blended/mixed in a conventional hot/cold, vertical/vertical plastic mixer. As homogenizing machine/gelatinizing machine for the PVC mixture, a double-screw extruder (110 mm pelletizing unit) was used. As plastic processing machine in connection with the decomposition of the chemical blowing agent, a single-screw extruder (90 mm) was used.

Various tool/forming units have been used, including a tool for production of an approximately 50 mm round profile. As a cooling unit there was used a static device where the walls were cooled at the same time as a liquid lubricant was applied between the interior walls of the cooling device and the plastic stock. As braking/retaining device a system of endless belts has been used. The heating of the plastic stock has been done in a static system with heated walls.

In developmental work there has also been used a cooling/braking and heating device built as one unit based on continuous walls in the form of endless steel belts.

The following are examples of plastic compositions that have been used (All are based on PVC thermoplastic):

EXAMPLE 1

| PVC (M-type K-number approx. 60) | 100 |
|---|---|
| Pe-wax | 0.8 |
| Ca-stearate | 0.4 |
| Tri-basic lead sulphate | 10 |
| Di-basic lead stearate | 2 |
| Azo-dicarbonamide | 1 |
| Sodium bicarbonate | 15 |
| Polymethyl methacrylate (PMMA) | 12 |
| Dioctylphthalate (DOP) | 16 |

EXAMPLE 2

| PVC (M-type K-number approx. 60) | 100 |
|---|---|
| Pe-wax | 0.2 |
| Calcium laurate | 0.3 |
| Tri-basic lead sulphate | 10 |
| Di-basic lead stearate | 1 |
| Azo-dicarbonamide | 1 |
| Sodium bicarbonate | 25 |
| Polymethyl methacrylate (PMMA) | 15 |
| Dioctylphthalate (DOP) | 25 |

The formula in example 1 yielded a PVC foam having a density of about 0.1 (about 100 kg/m$^3$).

The formula in example 2 produced a PVC foam having a density of about 0.07 (about 70 kg/m$^3$).

The various components in the above plastic compositions were mixed in a hot/cold, vertical/vertical high-speed mixer to a temperature of about 120° C.

After being cooled, the mixture was fed to a pelletizing unit consisting of a double-screw extruder. The temperature of the plastic mass in the pelletizing unit at the outlet was about 130° C. The granulate was then fed to a single-screw 90 mm extruder which was extended to about 40 D.

The pressure in the extruder immediately after the hopper was taken up to about 1200 bars. The pressure was reduced to about 250 bars at the outlet of the machine. The temperature of the compound immediately after the hopper was brought up to about 210° C. The compound temperature was reduced to about 165° C. at the outlet of the machine. The stock temperature at the outlet of the expansion apparatus (consisting of cooling unit, braking device and heating unit) was about 120° C.

Under special circumstances it would be desirable to cross-link the plastic foam. This can be done, for example, by using radiation, using peroxides, using amides, using silanes or using isocyanates. Due to the risk of cross-linking of the plastic material in the plastic processing machine, it may be advantageous to add the cross-linking component at a later stage in the plastic processing machine, or immediately after the plastic processing machine in a separate mixing unit.

I claim:

1. A process for the continuous or semi-continuous production of cellular plastic material from a plastic compound and a blowing agent comprising:
   providing a plastic compound and a blowing agent to a plastic processing machine;
   kneading the plastic compound and blowing agent under sufficient temperature and pressure conditions to produce a plastic composition which will produce an expanded composition upon release of pressure alone;
   transferring the composition to a cooling zone:
   cooling the composition in the cooling zone to provide a continuous stock under pressure, formed by an upstream-directed pressure component, said continuous stock having high viscosity and rigidity and an approximately flat velocity profile within the cooling zone, and simultaneously maintaining friction at a minimal level between walls of said cooling zone and said composition;
   braking-retaining the continuous stock without significantly modifying the flat velocity profile to build-up the upstream directed pressure component until the pressure in the plastic composition in upstream located zones is sufficient to prevent expansion of the plastic material; and
   releasing pressure to expand the plastic composition to form the expanded composition of a desired density.

2. The process of claim 1 further comprising adding pressure-regulative substances and additives to said plastic processing machine.

3. The process of claim 1 further comprising a braking-retaining step separate from said cooling step.

4. The process of claim 1 further comprising heating the continuous stock after a braking-retaining step and immediately before or during the release of pressure.

5. The process of claim 1 wherein a lubricant is added to reduce friction between the plastic composition and the plastic processing machine.

6. The process of claim 1 comprising, following said kneading, maintaining the cross-sectional area of said composition approximately equal except for a region immediately before expansion where the composition cross-section is approximately equal to or greater than the cross-section of the composition upstream thereof.

7. The process of claim 1 wherein said blowing agent is a chemical blowing agent.

8. A process for the continuous or semi-continuous production of cellular plastic material from a plastic compound and a blowing agent comprising:
   providing a plastic compound and a blowing agent to a plastic processing machine;
   kneading the plastic compound and blowing agent under sufficient temperature and pressure conditions to produce a plastic composition which will produce an expanded composition upon release of pressure alone;
   transferring the composition to a cooling zone:
   cooling the composition in the cooling zone to provide a continuous stock under pressure, formed by an upstream-directed pressure component, said continuous stock having high viscosity and rigidity and an approximately flat velocity profile within the cooling zone;
   braking-retaining the continuous stock without significantly modifying the flat velocity profile to build-up the upstream directed pressure component until the pressure in the plastic composition in upstream located zones is sufficient to prevent expansion of the plastic material, wherein said braking-retaining is performed by moving belts or rollers to reduce friction between said continuous stock and said braking-retaining; and releasing pressure to expand the plastic composition to form the expanded composition of a desired density.

9. An apparatus for the continuous or semi-continuous production of cellular plastic material from a plastic compound and a blowing agent comprising:
   a plastic processing machine having mixing and kneading means, an entrance and an exit;
   means for adding a blowing agent to said plastic processing machine;
   heating means for heating a plastic composition in said plastic processing machine and pressure means sufficient to prevent the blowing agent from expanding the plastic composition in said plastic processing machine:
   cooling means connected to said plastic processing machine at said exit for cooling a plastic composition exiting said plastic processing means to form a continuous stock, and for maintaining said plastic composition at a high viscosity and rigidity and an approximately flat velocity profile within said cooling means, said cooling means further comprising a wall means for contacting and restraining said plastic composition against expansion and means for avoiding or minimizing friction between said wall and said plastic composition;
   braking-retaining means to build-up the upstream directed pressure until the pressure in the plastic composition in upstream located zones is sufficient to prevent expansion of the plastic material, said braking-retaining means maintaining said flat velocity profile; and
   pressure releasing means to expand the plastic composition to form the expanded composition of a desired density,
   wherein the flat velocity profile is not significantly changed throughout said cooling, braking-retaining and immediately before said pressure releasing means.

10. The apparatus of claim 9 further comprising a braking-retaining means separate from said cooling means.

11. The apparatus of claim 9 further comprising heating means for heating said pressure releasing means.

12. The apparatus of claim 9 wherein a cross-sectional area of said continuous stock in the cooling and braking-retaining means is approximately equal except for a region immediately before expansion which is approximately equal to or greater than the cross-section upstream thereof.

13. An apparatus for the continuous or semi-continuous production of cellular plastic material from a plastic compound and a blowing agent comprising:
   a plastic processing machine having mixing and kneading means, an entrance and an exit;
   means for adding a blowing agent to said plastic processing machine;
   heating for heating a plastic composition in said plastic processing machine and pressure means sufficient to prevent the blowing agent from expanding the plastic composition in said plastic processing machine;
   cooling means connected to said plastic processing machine at said exit for cooling a plastic composition exiting said plastic processing means to form a continuous stock, and for maintaining said plastic composition at a high viscosity and rigidity and an approximately flat velocity profile within said cooling means;
   braking-retaining means to build-up the upstream directed pressure until the pressure in the plastic composition in upstream located zones is sufficient to prevent expansion of the plastic material, said braking-retaining means maintaining said flat velocity profile, wherein said braking-retaining means comprises moving belts or rollers to reduce friction between said continuous stock and said braking-retaining means; and
   pressure releasing means to expand the plastic composition to form the expanded composition of a desired density.

* * * * *